United States Patent Office 3,409,536
Patented Nov. 5, 1968

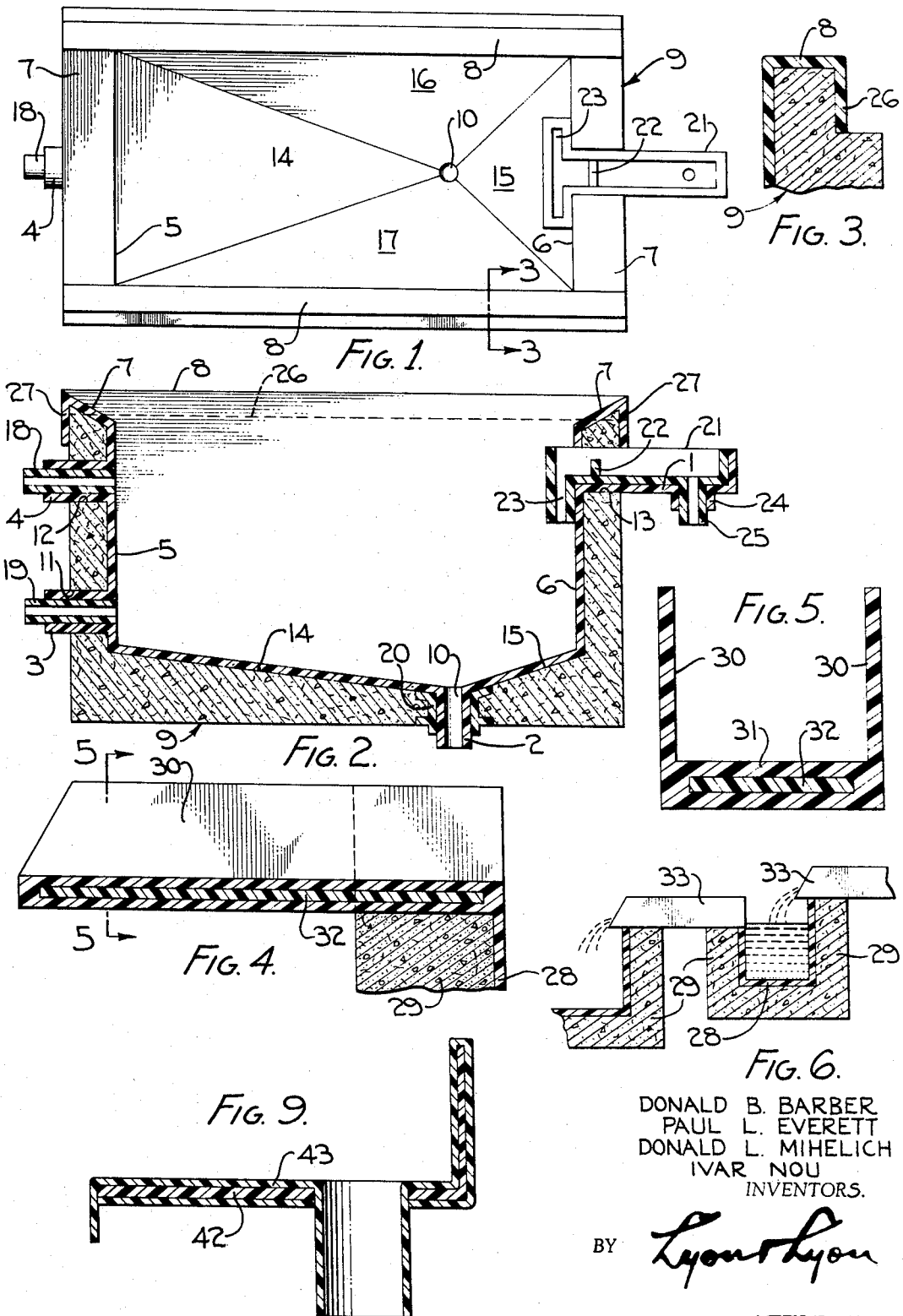

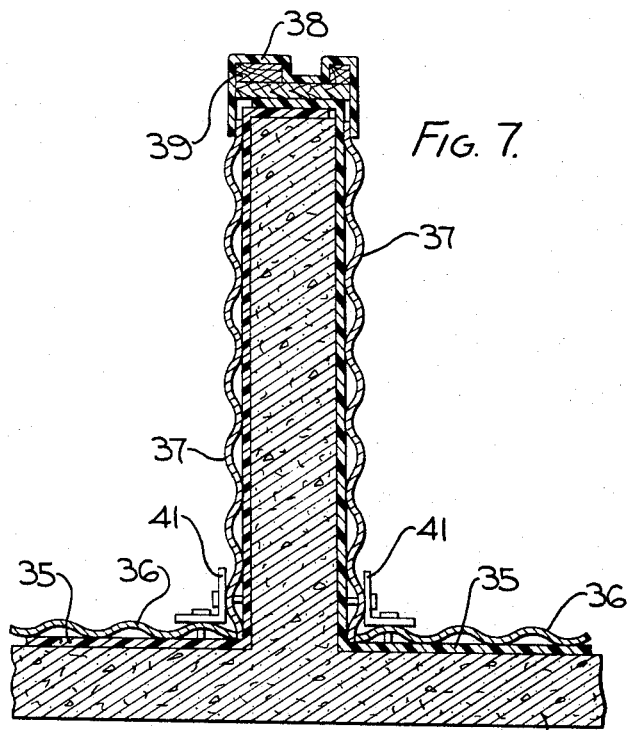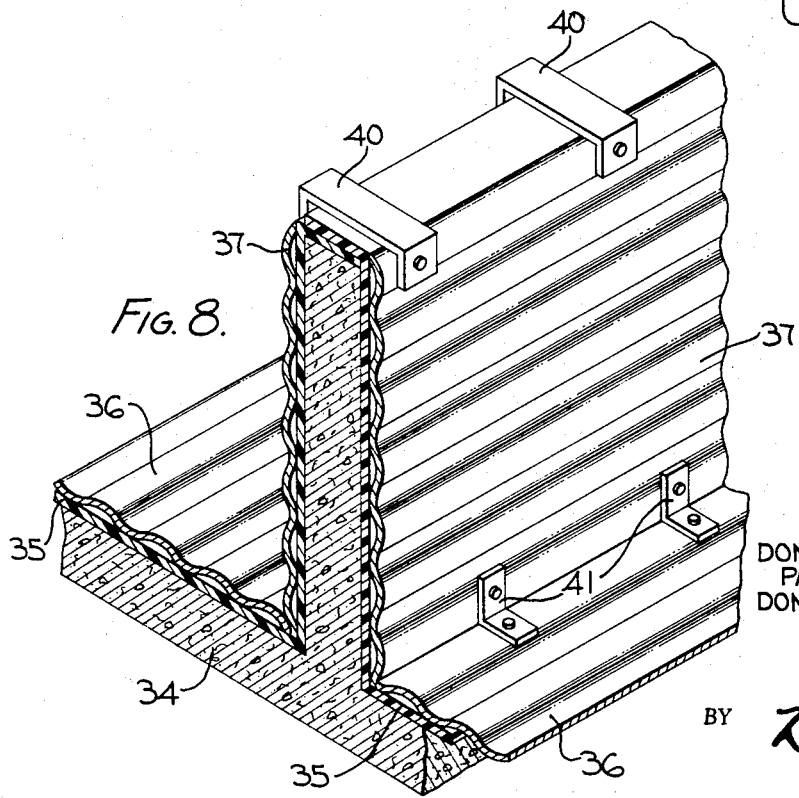

3,409,536
ELECTROLYTIC CELL WITH CELL LINER
Donald B. Barber, Los Angeles, Paul L. Everett, South Gate, Donald L. Mihelich, Redondo Beach, and Ivar Nou, North Hollywood, Calif., assignors to The Barber-Webb Company, Los Angeles, Calif., a corporation of California
Continuation of application Ser. No. 286,368, June 7, 1963. This application June 3, 1966, Ser. No. 562,036
9 Claims. (Cl. 204—275)

This application is a continuation of Ser. No. 286,368, now abandoned, filed June 7, 1963, the disclosure of which is incorporated herein by reference.

The present invention relates to cell liners for electrolytic cells such as those used to refine metals, e.g., copper, zinc, lead, cadmium, etc. More particularly, the present invention relates to cell liners which are fabricated from polymeric or plastic materials and to the methods of producing and installing these liners.

There have been several previous attempts by prior art workers to produce plastic cell liners. These attempts have been substantially unsuccessful because of cracking, warping, delamination and other types of structural failures. This lack of success has been particularly notable in attempts to produce a seamless, one-piece liner. There has been continued interest in the production of such liners because an acceptable plastic liner would have many substantial advantages, e.g., resistance to attack by chemicals, low cost, ease of installation, maintenance and repair, elimination of lead (which has been conventionally used as a liner material) and other metallic or conductive members from electrolytic cells thereby substantially eliminating stray courrents which decrease the efficiency of the electrolytic function of the cells, etc.

Thus, it is a principal object of the present invention to provide a plastic or polymeric cell liner.

It is another object of the present invention to provide a seamless plastic cell liner.

It is a further object of the present invention to provide a seamless, one-piece plastic cell liner which is not subject to structural failure such as cracking, warping, etc.

A further object of the present invention is to provide a cell liner comprising a seamless, one-piece plastic member in combination with hard-surfaced non-metallic panels.

It is a still further object of the present invention to provide processes for producing and installing the cell liners of the present invention.

Other objects and advantages of the present invention, it is believed, will be apparent from the following detailed description of specific embodiments thereof read in connection with the drawings.

Briefly, the present invention comprises the use of a plastisol to produce a cell liner. In a preferred embodiment of the present invention, a polyvinylchloride plastisol is formed into a cell liner having an appropriate configuration by a mold coating and curing process. However, it is to be understood that other plastisols and molding techniques may be employed. In the preferred embodiment for installation of the cell liner of the present invention, the liner is preheated to render it sufficiently flexible that it may be caused to assume substantially the shape of the cell into which it is inserted. Upon cooling, the liner is in substantially close contact with the wall of the cell and conforms with a great degree of accuracy to the configuration thereof as compared with conventional liners. However, once again, it is to be understood that other installation techniques may be used. In the practice of the present invention, it has been found that unexpected superior results may be obtained if certain dimensions of the molded liner are the same as the corresponding dimensions of the cell while certain other dimensions are both less than and greater than other corresponding dimensions of the cell. Thus, in the preferred embodiment of the present invention wherein a polyvinylchloride plastisol is used to produce a substantially rectangular cell liner, the molded liner is slightly undersized in width and depth, full size in length and the end flanges thereof are slightly oversized. However, the liner may have other configurations, e.g., circular. Furthermore, it has been found that a unique combination of materials and configurations will permit production of a cell liner which eliminates the need for any metallic or conductive elements in the cell. In general, this combination involves the use of rigid plastic elements( which are located at certain strategic areas) with a substantially flexible liner. Still further, the present invention includes the use of hard-surfaced nonmetallic panels in combination with the cell liner. The processes of producing and installing these liners form a part of the present invention.

In the drawings:

FIGURE 1 illustrates a top view of a cell and cell liner.

FIGURE 2 is an illustration in cross-section of the cell and cell liner illustrated in FIGURE 1.

FIGURE 3 is an illustration of a partial section taken on line 3—3 of the cell illustrated in FIGURE 1.

FIGURE 4 is a side view in cross-section of an outlet means which may be included as part of the cell liner of the present invention.

FIGURE 5 is a frnot view in cross-section of the outlet means illustrated in FIGURE 4.

FIGURE 6 illustrates the operation of the outlet means of FIGURE 4.

FIGURE 7 illustrates the combination of hard-surfaced panels with the liner of the present invention.

FIGURE 8 is a pictorial view of a structure similar to that shown in FIGURE 7.

FIGURE 9 illustrates an alternate embodiment of an overflow box that may be used in the present invention.

A preferred embodiment of the present invention is described in the following example.

*Example*

Matched metal molds conforming to the configuration of outlets 1, 2, 3, and 4 (as illustrated in FIGURE 2) were assembled and heated to a temperature of about 325° F. These molds were fabricated from polished steel plates. A polyvinylchloride plastisol was then poured into the molds such that a thickness of approximately one-eight inch of plastisol was obtained. The plastisol used was that designated 4174–1 by the manufacturer. These molds were then reheated to 325° F. and mounted on a principal mold having the configuration of the cell illustrated in FIGURES 1 and 2. The assembled mold was then heated to a temperature of about 325° F.

Ends 5 and 6 where then coated with a polyvinylchloride plastisol designated 4266–1 and flanges 7 and 8 were coated with the same material. The mold was then reheated to 325° F. and the sides and bottom were coated with 4266–1. In each case, the coating was about one-eighth inch thick.

The coated mold was then placed in an oven and brought to a temperature of 360° F. The mold and coating were then held at this temperature for ten minutes to cure the coating. The cured coating and mold were then removed from the oven, allowed to cool and the coating was stripped from the mold.

The cell liner of the present invention was now ready for installation. The liner, however, was not molded such that it was precisely the same size as the cell into which it was to be installed. Rather, the width and the length of the liner were undersized while end flanges 7 were oversized. In general, most electrolytic cells are approximately nine feet in length, and about four feet in depth and width. End flanges 7 are usually about four inches long. For cells of this size, it is preferred to mold the liner such that the liner is about one-half inch undersized in width and about one-half inch undersized in depth. It is also preferred to mold end flanges 7 such that they are about one-half inch oversized. The length of the molded liner is the same as that of the cell. The same quantitative differences between liner size and cell size may be maintained for cells having dimensions somewhat different from that described above. However, where the cell is very substantially different in size from that previously described, it may be necessary to make corresponding changes in the quantitative differences between the size of the cells and the size of the liner in order to achieve optimum results. According to the preferred method for installing the liner of the present invention, the liner was mounted on a rack having the same general dimensions as the cells in such a manner that the open end of the liner was pointed downwardly. The liner was then brought to a temperature of 150° F. by applying steam. Other heating mediums could, of course, be used. The liner was then inverted such that the open end was pointing upwardly and was inserted into the cell. Flanges 7 and 8 were then secured to prevent substantial movement, the rack was removed and the cell was substantially filled with the electrolytic cell solution which had a temperature of about 150° F. The weight of this solution caused the liner to assume the configuration of the cell. It has been found that the end flanges 7 contract such that they come into loose contact with the end walls of the cell.

It will be readily apparent to those skilled in the art that, given the principal of the present invention, mold and installation procedures different from those described in the foregoing example may be used. For example, the cell liner of the present invention could be slush molded, blow molded, formed by dipping on a male mold, injection molded, centrifugally molded, etc. Furthermore, installation may be accomplished by heating the liner after it has been inserted into the cell with steam, the cell solution itself or other suitable heating mediums. Additionally, a pressure source other than the cell solution itself may be used to cause the liner to assume the configuration of the cell. For instance, this pressure may be applied manually. In most cases, it has been found desirable to manually locate the outlets, e.g., elements 1, 21, 3, and 4 in FIGURE 2, in the corresponding apertures in the cell. In fact, the flexibility of the liner of the present invention which permits such location of the outlets is one of the distinct advantages of this liner because electrolytic cells are not exactly uniform in construction. Thus, serious difficulties are encountered when attempts are made to mass produce rigid one-piece liners because the outlet projections in such liners often do not come into satisfactory alignment with the corresponding apertures in the cells.

Furthermore, it has been found advantageous to fabricate the liners of the present invention such that the outlets, particularly outlets 2, 3 and 4 as illustrated in FIGURE 2, are made from a more flexible material than that used to fabricate the remainder of the liner. In the preceding example, the plastisol used to form the outlets produced a relatively flexible material when cured as compared with the body of the liner. However, it is to be understood that the body of the liner is preferably substantially flexible as was the body of the liner described in the preceding example.

Still further, the process conditions described in the preceding example may, of course, be varied to some extent without departing from the present invention.

Referring now to the drawings, certain preferred embodiments of the liner of the present invention will be described. It should be understood that these liners may be produced and installed in any of the manners previously described. However, it should also be understood that the unique features of these liners are themselves inventive.

As has previously been described, FIGURES 1 and 2 illustrate a liner having outlets 1, 2, 3 and 4, end walls 5 and 6, end flanges 7 and side flanges 8. This liner is installed in a wood, steel or concrete cell 9 which is provided with apertures 10, 11 and 12 which accommodate outlets 2, 3 and 4 respectively. Cell 9 is also provided with a groove or notch 13 which accommodates outlet 1. The bottom of cell 9 is provided with sloped walls 14, 15, 16 and 17 which function to facilitate draining of the cell through outlet 2.

One of the unique features of the liner of the present invention is that it may be provided with rigid members such as members 18 and 19 which may be fabricated from rigid polyvinylchloride or other polymeric material. These rigid members impart structural strength to the liner, but, more important, greatly facilitate hose connections with the outlets since they provide the necessary resistance for clamps and the like which may be used to make the hose connections secure. These rigid members may be positioned interiorly of the outlets as is the case of members 18 and 19 or may be positioned externally of the outlets as is the case with member 20. Furthermore, these rigid members may be formed integrally with the cell itself in the manner of member 20.

The liner of the present invention may be provided with an overflow or level control outlet 1 which is positioned in notch 13. Preferably, outlet 1 is provided with a rigid outlet box 21 which may be fabricated from polyvinylchloride or a suitable polymer. Outlets of this kind have conventionally been made from lead or other conductive materials which create stray currents thereby decreasing the efficiency of the electro-deposition in the cell. Thus, this unique feature of the present invention enables the cell to function in a manner superior to conventional cells. Overflow box 21 may also be provided with weir 22 and walls defining channel 23. Outlet 24 of the liner accommodates projection 25 of outlet box 21. As previously described, projection 25 facilitates hose connections with outlet 24.

As illustrated in FIGURE 3, side flange 8 of the liner is provided with skirt 26 which aids in holding the liner in place in the cell. Similarly, end flanges 7 are provided with skirt 27 for the same reason.

A separate and distinct embodiment of the present invention is illustrated in FIGURES 4–6. This embodiment comprises an overflow box which may be used in cells which are arranged for cascade overflow as is often the case in zinc refining facilities. In the past, overflow units such as that illustrated in FIGURE 4 have been made from such unsatisfactory prior art materials as lead. The present invention permits the use of polyvinylchloride or other non-conductive polymers. In its preferred embodiment, as illustrated in FIGURE 4, this overflow box comprises an integral continuation of liner 28 which rests upon concrete wall 29 of a cell and extends outwardly therefrom. The external portions of the overflow device, i.e., side walls 30 and bottom wall 31 comprise the same material as liner 28 and are relatively flexible although walls 30 are sufficiently inflexible such that they will not bend under their own weight. In addition, the overflow device is provided with a rigid internal support member 32 which may be made from rigid polyvinylchloride or other polymer.

FIGURE 6 illustrates a series of cells having walls 29 and provided with liners 28. As shown in this figure, overflow devices 33 and the cells are mounted in cascade fashion such that the overflow from the higher cells flows into the lower cells. The lowermost cell is provided with a conventional drain device which conducts the cell solution from this lowermost cell to a distribution system for recycle, regeneration, storage or disposal.

Still other embodiments of the present invention are illustrated in FIGURES 7 and 8 which show the combination of the liner of the present invention with hard-surfaced nonmetallic panels. As shown in these figures, cell 34 is provided with liner 35 and corrugated panels 36 and 37. These panels are produced from hard-surfaced nonmetallic materials such as polypropylene, rigid polyvinylchloride, polyethylene, ceramics, cement compositions, fiberglass compositions and the like. The purpose of panels 36 and 37 is to prevent cutting of liner 35. In FIGURE 7, a plastic cover 38 is positioned over capping board 39 thereby, in effect, encasing the entire cell in plastic. Other means of assembling the rigid liners may also be used such as the connectors 40 shown in FIGURE 8 and the connectors 41 shown in FIGURES 7 and 8. If desired, the rigid panels may be made an integral part of the liner by attaching them to the liner by means of an adhesive or by molding an integral unit by combining the panels with the lining before the lining is cured. It is preferred, although not necessary, to form panels 36 and 37 such that they are corrugated.

Another embodiment of an overflow means which may be used in place of means 21 illustrated in FIGURES 1 and 2 is illustrated in FIGURE 9. As shown in this figure, rigid reinforcing means 42 is encased in liner 43 in a manner similar to that shown in FIGURES 4 and 5 and may be made from the same materials as means 21 or insert 32. Both means 21 and the overflow means illustrated in FIGURE 9 are thus non-conductive and prevent the undesirable stray currents which are caused by lead, steel, etc. Thus, the overflow means of the present invention are distinctly superior to the conductive devices of the prior art.

It will be readily apparent to those skilled in the art that the specific embodiments previously described may be substantially modified without departing from the scope of the present invention. For example, any suitable plastisol other than the polyvinylchloride plastisols described in the example may be used. Furthermore, the liners of the present invention may be made in multiple units, i.e., a single liner for several cells may be made by molding the liner such that the body portions which are inserted into the cells have common side flanges, end flanges, or both. The number and type of outlets provided on the liner will, of course, depend upon the construction of the cell into which the liner is to be inserted. The thickness of the liner may be varied according to the particular cell in which it is to be used. However, thicknesses of one-eighth inch to one-half inch have been found satisfactory for most cells. Furthermore, the liner of the present invention may be molded in circular form for use in circular cells. In this case, the depth and width, i.e., diameter, of the liner are molded such that they are slightly undersize with respect to the corresponding cell dimensions.

Having fully described our invention, it is to be understood that we are not to be limited to the specific details set forth, but that the present invention is of the full scope of the appended claims.

We claim:

1. In an electrolytic cell comprising a cell having one or more conduits for conducting fluids, and a liner received within said cell, said liner having a bottom and walls corresponding to those of the cell to protect the interior surfaces of said cell; the improvement wherein said liner within said cell is liquid-tight and comprises a flexible, heat conformable, seamless, solid, one-piece molded plastisol which prior to installation has at least one dimension smaller than the corresponding interior dimension of the cell, and said liner within said cell being heat conformed to the interior dimensions of said cell.

2. The cell of claim 1 wherein at least one of said walls is provided with at least one electrically nonconductive outlet means.

3. In a rectangular-shaped electrolytic cell comprising a cell having one or more conduits for conducting fluid, and a liner received within said cell, said liner having a bottom, and substantially vertical side and end walls corresponding to those of the cell to protect the interior surfaces of said cell; the improvement wherein said liner within said cell is liquid-tight and comprises a flexible, heat conformable, seamless, solid, one-piece molded plastisol, said liner prior to installation in said cell being substantially co-extensive with the cell in length but slightly undersize in width and depth, and said liner within said cell being heat conformed to the interior dimensions of the cell.

4. The cell of claim 3 wherein said liner has a thickness of from ⅛″ to ½″.

5. The cell of claim 3 wherein said plastisol is polyvinylchloride.

6. An electrolytic cell having a seamless, solid, one-piece liner of molded plastisol, the liner being substantially coextensive with the cell in length but slightly undersize in width and depth and being adapted to expand to the configuration of the cell, said cell and liner having an overflow outlet comprising bottom and side walls, and a rigid substantially electrically non-conductive outlet box having bottom and side wall portions interior of the liner outlet bottom and side walls.

7. The cell of claim 6 wherein said overflow outlet in said liner comprises a projection of molded plastisol integral with the liner and a reinforcing member of rigid substantially electrically non-conductive material, and said outlet box in said liner comprises a hollow projection of molded plastisol integral with the liner and a rigid conduit member of substantially electrically non-conductive material reinforcing said hollow projection.

8. The cell of claim 6 wherein said liner has a thickness from about ⅛″ to ½″.

9. The cell of claim 6 wherein the plastisol is polyvinylchloride.

References Cited

UNITED STATES PATENTS

| | | | |
|---|---|---|---|
| 2,321,777 | 6/1943 | Schelhammer et al. | 220—63 |
| 2,876,927 | 3/1959 | Henning | 220—63 |
| 2,956,915 | 10/1960 | Korn et al. | 220—63 |
| 2,972,573 | 2/1961 | Capaccini | 204—275 |
| 3,095,259 | 6/1963 | Smith | 264—302 XR |
| 3,177,501 | 4/1965 | Kwake | 220—63 |

OTHER REFERENCES

Evans, V.: "Tank Linings and Insulating Materials." Journal of Electrodepositor's Technical Society, volume 24, 1948–49, pp. 129–143.

Helme, Clarence C.: "Tanks for Cleaning and Plating." Metal Industry, May 1940, pp. 263–268.

JOHN H. MACK, Primary Examiner.

D. R. VALENTINE, Assistant Examiner.